US009173792B2

(12) United States Patent
Goffer

(10) Patent No.: US 9,173,792 B2
(45) Date of Patent: Nov. 3, 2015

(54) STANDING WHEELCHAIR

(71) Applicant: Amit Goffer, Kiryat Tivon, IL (US)

(72) Inventor: Amit Goffer, Kiryat Tivon, IL (US)

(73) Assignee: UPNRIDE ROBOTICS LTD, Yokneam-Illit (IL)

( * ) Notice: Subject to any disclaimer, the term of this patent is extended or adjusted under 35 U.S.C. 154(b) by 0 days.

(21) Appl. No.: 14/083,453

(22) Filed: Nov. 19, 2013

(65) Prior Publication Data

US 2015/0060162 A1    Mar. 5, 2015

Related U.S. Application Data

(60) Provisional application No. 61/870,955, filed on Aug. 28, 2013.

(51) Int. Cl.
| | |
|---|---|
| *A61G 5/14* | (2006.01) |
| *A61G 5/00* | (2006.01) |
| *A61G 5/04* | (2013.01) |
| *A61G 5/10* | (2006.01) |
| *B60L 11/18* | (2006.01) |

(Continued)

(52) U.S. Cl.
CPC .. *A61G 5/14* (2013.01); *A61G 5/04* (2013.01); *A61G 5/042* (2013.01); *A61G 5/10* (2013.01); *A61G 5/104* (2013.01); *B60L 11/1803* (2013.01); *B60L 11/1877* (2013.01); *B60L 15/20* (2013.01); *A61G 5/1067* (2013.01); *A61G 2005/1078* (2013.01); *A61G 2005/1089* (2013.01); *A61G 2005/1097* (2013.01); *A61G 2005/124* (2013.01); *A61G 2005/127* (2013.01); *A61G 2005/128* (2013.01); *A61G 2203/14* (2013.01); *A61G 2203/42* (2013.01); *B60L 2200/16* (2013.01)

(58) Field of Classification Search
CPC ................................... A61G 5/00; A61G 5/14
See application file for complete search history.

(56) References Cited

U.S. PATENT DOCUMENTS

| | | | | | |
|---|---|---|---|---|---|
| 4,054,319 | A | * | 10/1977 | Fogg et al. | 297/466 |
| 4,390,076 | A | * | 6/1983 | Wier et al. | 180/11 |
| 4,437,537 | A | * | 3/1984 | Ausmus | 180/313 |

(Continued)

FOREIGN PATENT DOCUMENTS

| | | |
|---|---|---|
| EP | 1475063 A1 | 11/2004 |
| WO | WO-9623478 | 8/1996 |
| WO | WO-2010109466 | 9/2010 |

OTHER PUBLICATIONS

Search Report for International Application No. PCT/IL2013/050953 dated Mar. 2, 2014.

*Primary Examiner* — Paul N Dickson
*Assistant Examiner* — Barry Gooden, Jr.
(74) *Attorney, Agent, or Firm* — Pearl Cohen Zedek Latzer Baratz LLP

(57) ABSTRACT

A standing wheelchair device includes a wheeled base for enabling the device to move on a supporting surface. A harness assembly includes a plurality of braces for attaching to parts of a body of a user of the device, at least some adjacent braces of being connected by joints. A lifting unit mounted on the base, supports a hip joint of the harness assembly, and is configured to raise or lower the hip joint. When the user is attached to the harness assembly and is in a sitting position, raising a height of the hip joint causes the user to assume a standing position. When the when the user is attached to the harness assembly and is in a standing position, lowering the hip joint causes the user to assume a sitting or reclining position.

17 Claims, 7 Drawing Sheets

(51) Int. Cl.
*B60L 15/20* (2006.01)
*A61G 5/12* (2006.01)

(56) References Cited

U.S. PATENT DOCUMENTS

| | | | |
|---|---|---|---|
| 4,456,086 A * | 6/1984 | Wier et al. ................ 180/11 |
| 4,623,194 A * | 11/1986 | Pillot ...................... 297/316 |
| 5,096,008 A | 3/1992 | Mankowski |
| 5,265,689 A * | 11/1993 | Kauffmann ............ 180/65.51 |
| 5,346,280 A * | 9/1994 | Deumite .................. 297/330 |
| 5,366,036 A * | 11/1994 | Perry ..................... 180/65.1 |
| 5,701,968 A * | 12/1997 | Wright-Ott et al. ..... 180/65.1 |
| 6,047,979 A * | 4/2000 | Kraft et al. ............ 280/250.1 |
| 6,125,957 A * | 10/2000 | Kauffmann ............. 180/65.1 |
| 6,231,067 B1 | 5/2001 | Johnson et al. |
| 6,832,770 B1 * | 12/2004 | Wright-Ott et al. ... 280/87.041 |
| 7,165,778 B2 * | 1/2007 | Kuiken ................... 280/250.1 |
| 7,264,272 B2 * | 9/2007 | Mulhern et al. ......... 280/755 |
| 7,338,133 B2 * | 3/2008 | Laffin ..................... 297/466 |
| 7,815,209 B2 | 10/2010 | Porcheron |
| 7,887,133 B2 | 2/2011 | Perk |
| 8,567,804 B1 * | 10/2013 | Hoenhause ............. 280/220 |
| 8,910,975 B2 * | 12/2014 | Bekoscke et al. ....... 280/755 |
| 9,044,369 B2 * | 6/2015 | Goldish et al. ............... 1/1 |
| 2002/0027334 A1 * | 3/2002 | Porcheron .............. 280/250.1 |
| 2002/0027385 A1 * | 3/2002 | Porcheron ............... 297/466 |
| 2004/0267175 A1 * | 12/2004 | Harnois ...................... 602/5 |
| 2005/0087375 A1 | 4/2005 | Steele et al. |
| 2006/0048785 A1 * | 3/2006 | Dalen et al. ............. 128/845 |
| 2008/0132383 A1 * | 6/2008 | Einav et al. ................. 482/8 |
| 2008/0295595 A1 * | 12/2008 | Tacklind et al. .......... 73/462 |
| 2010/0004820 A1 * | 1/2010 | Bekoscke et al. ......... 701/38 |
| 2010/0207354 A1 | 8/2010 | Hunziker |
| 2011/0201978 A1 * | 8/2011 | Jeon et al. ................ 601/35 |
| 2013/0113178 A1 * | 5/2013 | Goldish et al. .......... 280/250 |
| 2013/0219615 A1 * | 8/2013 | Eklof et al. ............... 5/83.1 |
| 2013/0253385 A1 * | 9/2013 | Goffer et al. ............. 601/35 |

* cited by examiner

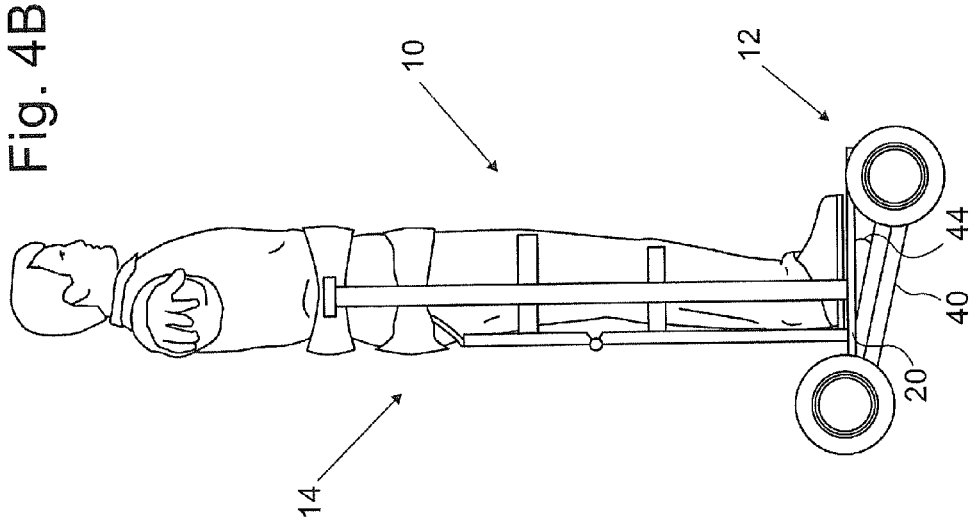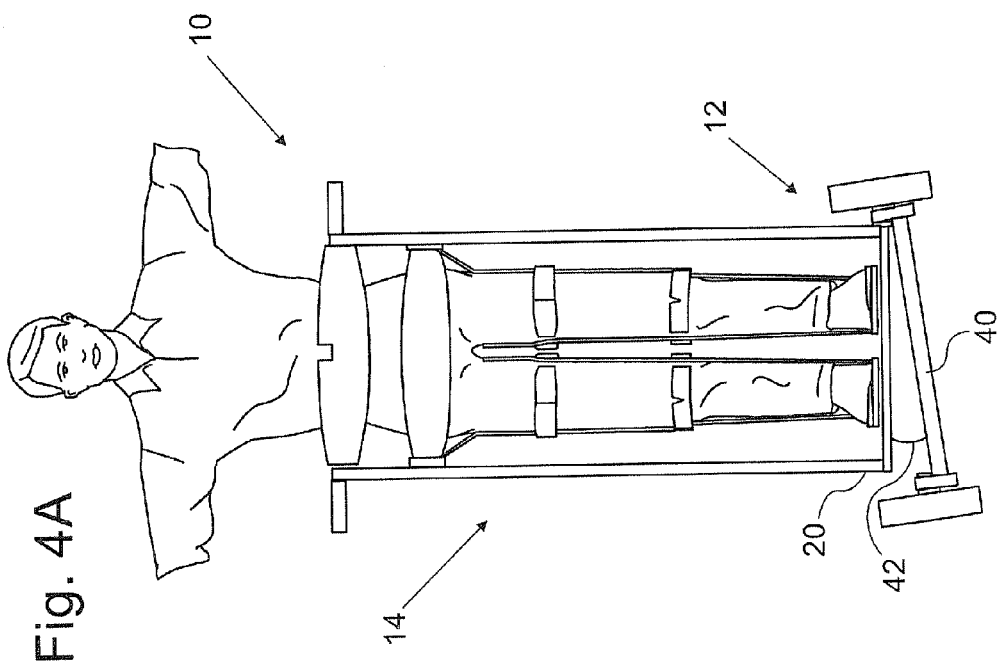

STANDING WHEELCHAIR

CROSS REFERENCE TO RELATED APPLICATIONS

The present invention claims the priority benefit of U.S. Provisional Patent Application No. 61/870,955 filed on Aug. 28, 2013, which is incorporated in its entirety herein by reference.

FIELD OF THE INVENTION

The present invention relates to a standing wheelchair.

BACKGROUND OF THE INVENTION

At least 6 million people worldwide require long-term or permanent confinement to wheelchairs due to lower limb disabilities. Lower limb disabilities may be caused by such conditions as spinal cord injury (SCI), traumatic brain injury (TBI), stroke, cerebral palsy (CP), spina bifida, multiple sclerosis (MS), and others. Long-term confinement to a sitting position in a wheelchair may cause or contribute to physiological or psychological deterioration. Such deterioration may result in poor health, poor quality of life, low self-esteem, and high medical expenses. In addition, sitting in a wheelchair may adversely affect or inhibit social interaction with others who are standing.

Wheelchairs have been described that enable a wheelchair user to stand. Various configurations of such described wheelchairs have been described for various purposes. Some enable the wheelchair user to stand during limited motion of the wheelchair. However, such described wheelchairs are optimized for motion when the user is seated. Stable motion of the wheelchair when the wheelchair user is standing may be limited, for example, to relatively slow motion on level surfaces.

SUMMARY OF THE INVENTION

There is thus provided, in accordance with some embodiments of the present invention, a standing wheelchair device including: a wheeled base for enabling the device to move on a supporting surface; a harness assembly including a plurality of braces for attaching to parts of a body of a user of the device, at least some adjacent braces of the braces being connected by joints; and a lifting unit mounted on the base, supporting a hip joint of the harness assembly, and configured to raise or lower the hip joint such that when the user is attached to the harness assembly and is in a sitting position, raising a height of the hip joint causes the user to assume a standing position, and when the user is attached to the harness assembly and is in a standing position, lowering the hip joint causes the user to assume a sitting or reclining position.

Furthermore, in accordance with some embodiments of the present invention, the wheeled base includes drive wheels that are operable by the user to cause the device to move over the supporting surface.

Furthermore, in accordance with some embodiments of the present invention, the wheeled base includes swivel wheels or steering wheels.

Furthermore, in accordance with some embodiments of the present invention, the hip joint is an active joint.

Furthermore, in accordance with some embodiments of the present invention, a knee joint of the harness assembly is an active joint.

Furthermore, in accordance with some embodiments of the present invention, the lifting unit includes at least one column of adjustable height.

Furthermore, in accordance with some embodiments of the present invention, the column is positioned such that when the user is attached to the harness assembly and is in a standing position, the user is positioned substantially above an epicenter of the wheeled base.

Furthermore, in accordance with some embodiments of the present invention, the column includes a mechanism for adjusting the height of the column, the mechanism being selected from a group of mechanisms consisting of a direct current motor, a ball screw gear, a hydraulic piston, a pneumatic piston, a Bowden cable, and a pulley.

Furthermore, in accordance with some embodiments of the present invention, the wheeled base includes a platform that is tiltable with respect to a chassis to which wheels of the wheeled base are connected, the harness assembly being tiltable together with the platform.

Furthermore, in accordance with some embodiments of the present invention, the device includes a sensor to detect a tilt of the platform.

Furthermore, in accordance with some embodiments of the present invention, the device includes a controller that is configured to maintain the platform at a predetermined tilt with respect to the horizontal.

Furthermore, in accordance with some embodiments of the present invention, the controller includes a PID controller.

Furthermore, in accordance with some embodiments of the present invention, the device includes a motor that is operable to adjust a tilt of the platform.

Furthermore, in accordance with some embodiments of the present invention, the device includes a user-operable control for controlling operation of the device.

Furthermore, in accordance with some embodiments of the present invention, the control includes user-operable device selected from a group of user-operable devices consisting of a joystick, a tilt sensor, a force sensor, and a microphone.

Furthermore, in accordance with some embodiments of the present invention, the device includes at least one support arm that is extendable to prevent tipping of the device.

Furthermore, in accordance with some embodiments of the present invention, a support arm of said at least one support arm is extendible from each side of the device.

Furthermore, in accordance with some embodiments of the present invention, the device includes a controller that is configured to automatically extend said at least one support arm when tipping of the device is indicated.

Furthermore, in accordance with some embodiments of the present invention, the device includes a sensor to generate a signal that is indicative of tipping of the device.

Furthermore, in accordance with some embodiments of the present invention, the sensor is selected from a group of sensors consisting of a tilt sensor, an accelerometer, a gyroscope, a force sensor, and a proximity sensor.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

FIG. 4A schematically illustrates operation of a lateral balancing mechanism of a standing wheelchair, in accordance with an embodiment of the present invention.

FIG. 4B schematically illustrates operation of a front-back balancing mechanism of a standing wheelchair, in accordance with an embodiment of the present invention.

DETAILED DESCRIPTION OF THE INVENTION

Figure 1A:
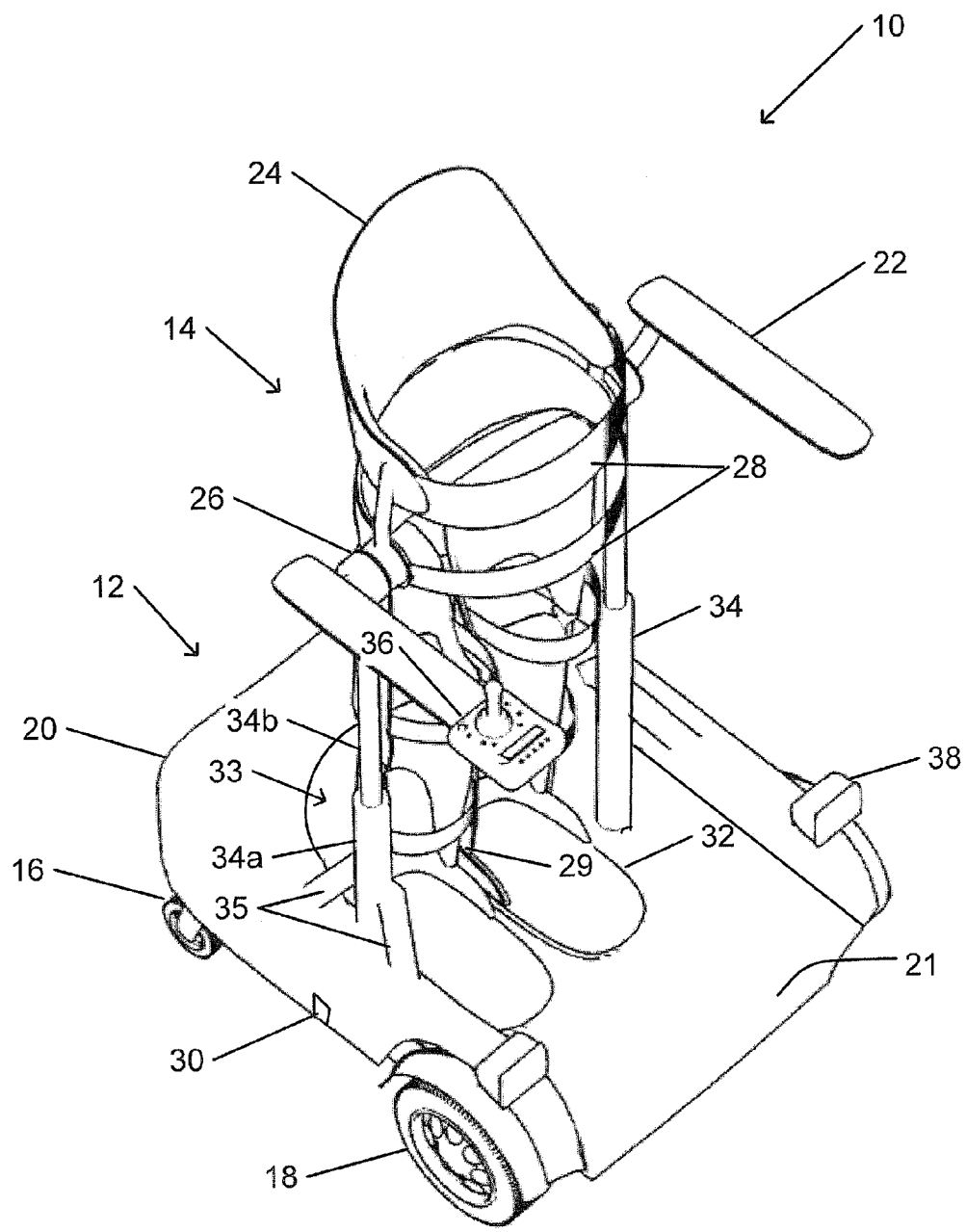
FIG. 1A shows a standing wheelchair in an upright mobility configuration, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

In accordance with embodiments of the present invention, a wheelchair is configured to enable a user of the wheelchair to stand or assume a standing position. The wheelchair is further configured to enable the wheelchair to be self propelled over a wide variety of surfaces in a stable manner while the user remains standing. The wheelchair may travel and be maneuvered while the user is standing in much the same manner as the wheelchair may travel and be maneuvered while the user is sitting. A wheelchair that is configured to travel while the user is standing is herein referred to as a standing wheelchair. (As used herein, the user is referred to as standing or in a standing position when the user's limbs are arranged, positioned, or oriented in the manner of a person who is standing. The user who is standing or in a standing position is typically supported by the standing wheelchair.)

A standing wheelchair, in accordance with embodiments of the present invention, includes a wheeled base that is configured to enable standing wheelchair to travel over a surface. The standing wheelchair may be pushed or pulled to cause the standing wheelchair to travel over the surface. The standing wheelchair may be motorized or otherwise configured to enable self-propulsion of the standing wheelchair over the surface. For example, the wheeled base may include a power supply to provide electrical or other power to propel the standing wheelchair (and to power other functions of the standing wheelchair). Wheels of the wheeled base may be configured so as to facilitate travel of the standing wheelchair on a variety of surfaces. A configuration of the wheeled base of a standing wheelchair may be adapted for a particular set of surfaces over which that standing wheelchair is expected to travel.

A standing wheelchair, in accordance with some embodiments of the present invention, includes a harness assembly that is configured to securely hold the user when the user is standing or sitting on the standing wheelchair. The harness assembly includes appropriately shaped braces, straps, clips, struts, or other components that may be utilized to hold the user securely to the standing wheelchair. Each of the braces is configured to attach to a part of the user's body. At least some pairs of adjacent braces are connected by joints that enable the braces to bend with respect to one another. Some or all of the joints may be active joints, including an actuator that is operable to apply a bending or extending force to the joint. The harness assembly includes a hip joint that is configured to be positioned near the user's hip. For example, the hip joint may connect a brace that is configured to attach to the lower torso (abdominal region) of the user, to braces that are configured to attach to the user's thighs. A brace that is configured to support the user's buttocks when in a sitting or reclining position may also attach to the hip joint. The buttocks support may be flexible (e.g., be made primarily of flexible cloth, rubber or plastic, or another flexible material).

The standing wheelchair includes a lifting unit that is mounted on the wheeled base. The lifting unit is configured to raise or lower the hip joint of the harness assembly, thus increasing or decreasing, respectively, the distance between the hip joint and the wheeled base. The lifting may include one or more vertical linear actuators. Each vertical actuator may include a substantially vertical post or column of variable length, and a mechanism for changing the length. For example, each column may connect a hip joint of the harness assembly with the wheeled base. The actuators may be operated to change a configuration of the standing wheelchair back and forth between a sitting (or reclining) configuration and a standing configuration. For example, the columns may be lengthened to increase the distance between the hip joint and the base, resulting in straightening of the joints and thus causing the user to stand. The columns may be shortened to decrease the distance between the hip joint and the base thus causing the joints to bend and bringing the user to a sitting (or reclining) position.

When the standing wheelchair is in a sitting configuration, a user may be held by the harness in a sitting position. (Unless indicated otherwise, description herein of a sitting configuration or position is applicable to reclining configuration or position, and should be understood as applying to both sitting and reclining configurations and positions.) When the standing wheelchair is in a standing configuration, a user may be held securely in a standing position. When standing substantially vertically in the standing position, the user is positioned substantially equidistantly from sides to of the base. The harness assembly may also be configured to hold the user securely in additional configurations. For example, the harness assembly may be configured to hold the user in any position that is intermediate between a standing position and a sitting position. As another example, the harness assembly may be configured to hold the user standing in a forward-leaning position or backward-leaning position, or in another position that is neither sitting nor standing, nor intermediate between sitting and standing.

When the user is shifted between various positions (standing, sitting, reclining and in-between), the user's center of gravity (COG) remains substantially in place (its position remains substantially unchanged).

One or more user-operable controls may be provided to enable the user to control operation of the standing wheelchair. For example, the controls may be operable to change of a configuration of the standing wheelchair from a current configuration to another configuration (e.g., sitting, standing, or another configuration). The controls may be operable to control motion of the wheeled base over a surface on which the standing wheelchair is being supported.

In accordance with some embodiments of the present invention, one or more features of the standing wheelchair may enable safe mobility of a user of the standing wheelchair, whether standing or sitting. For example, harness assembly may be configured such that the wheeled base is always arranged approximately symmetrically about the center of gravity (COG) of the standing wheelchair when the user is held by the harness assembly of the standing wheelchair. For example, the center of gravity may be approximately equidistant from each side of the wheeled base. In this case, the distance from the center of gravity to each side may be defined as the horizontal distance from the center of gravity to that side along a perpendicular to that side. The symmetry (or equidistance) of the wheeled base about the center of gravity may be preserved regardless of the configuration of the harness assembly. For example, when changing configuration, the harness assembly may move various parts of the user's body in order to preserve the symmetry. In this manner, the risk of tipping is minimized in all configurations.

The standing wheelchair may be provided with an automatic balancing capability. The automatic balancing capability enables the user to remain upright when the standing wheelchair travels over sloped surfaces or over surfaces of varying slope. The automatic balancing capability may receive a sensed current tilt of the standing wheelchair from one or more sensors. The automatic balancing capability may be configured to operate one or more components of the wheeled base or of the harness assembly in order to ensure that user remains level (e.g., relative to the local vertical or horizontal). For example, one or more components of the wheeled base or of the harness assembly may be configured so as to tilt in order to counteract any tilting caused by a surface over which the standing wheelchair is traveling. In this manner, the user feels comfortable, and the risk of tipping is minimized, in any configuration and on any surface.

A standing wheelchair, in accordance with some embodiments of the present invention, may be provided with additional safeguards to prevent accidental tipping of the standing wheelchair. For example, the standing wheelchair may be provided with additional support wheels, wheeled arms, or struts that may be rapidly extended to prevent tipping when danger of tipping is sensed (e.g., by a tilt sensor).

Figure 1B:
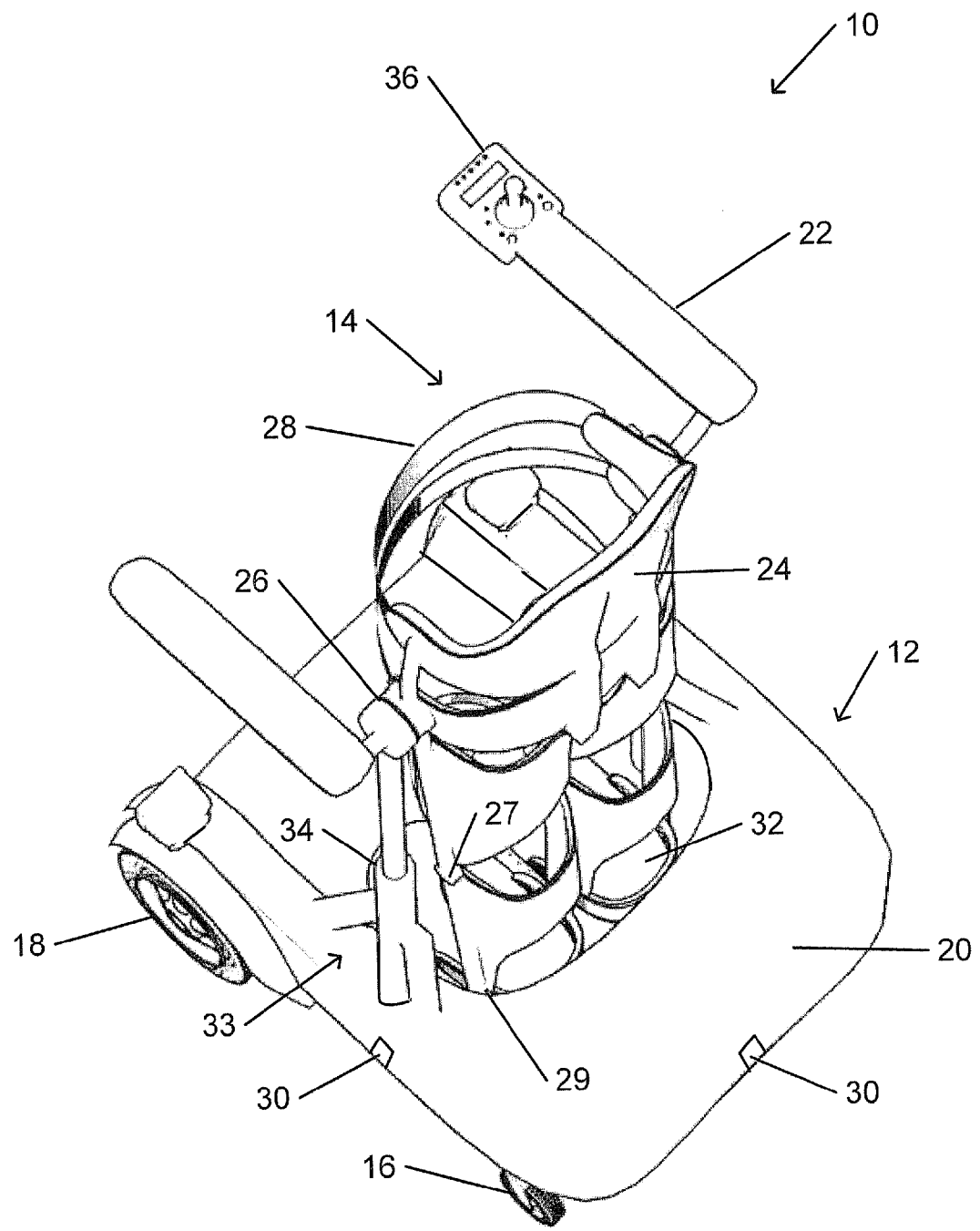
FIG. 1B shows the standing wheelchair shown in FIG. 1A as viewed from another angle.
Figure 3:
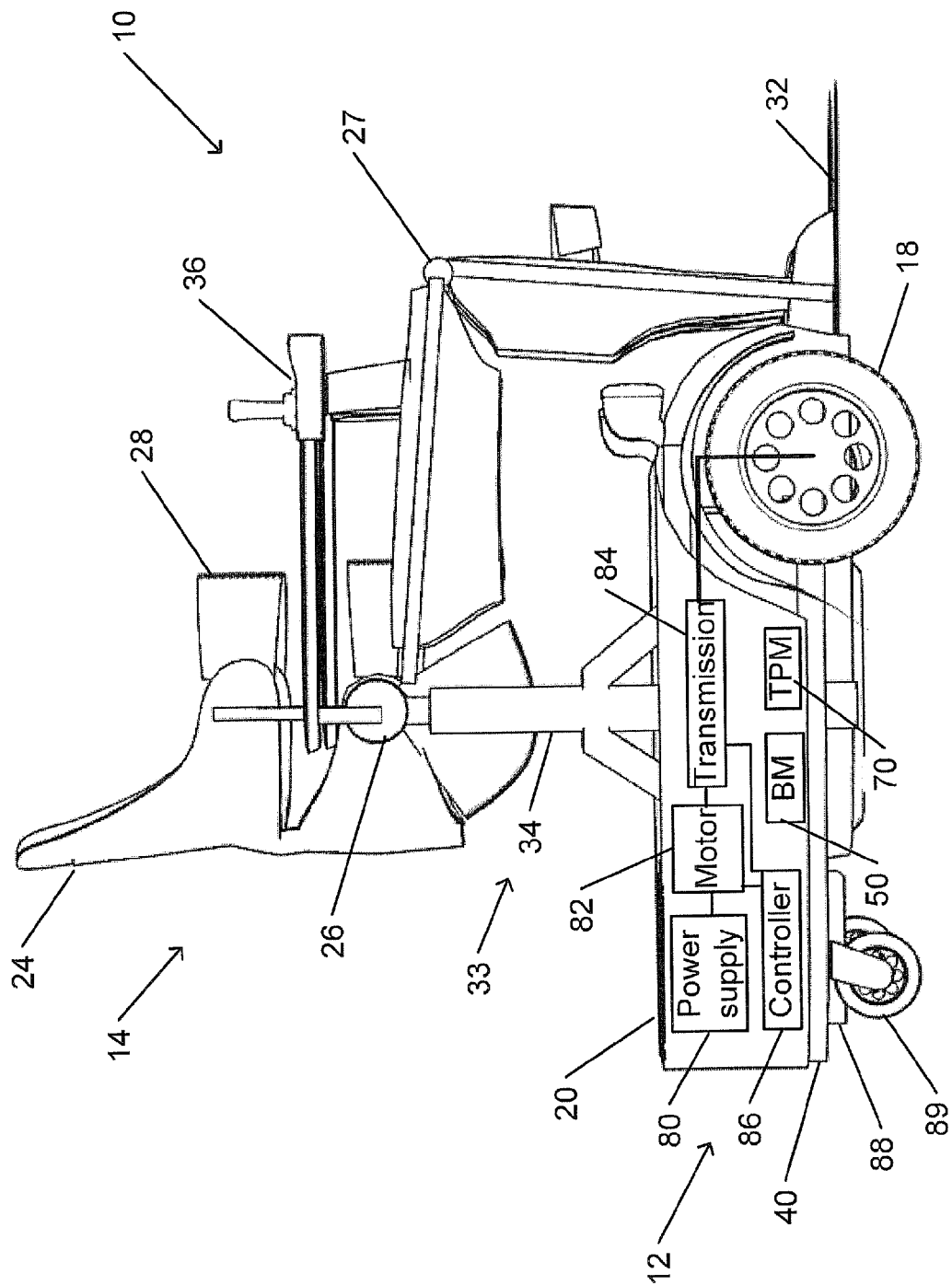
FIG. 3 schematically illustrates operation systems of a standing wheelchair, in accordance with an embodiment of the present invention.

FIG. 1A shows a standing wheelchair in an upright mobility configuration, in accordance with an embodiment of the present invention. FIG. 1B shows the standing wheelchair shown in FIG. 1A as viewed from another angle. FIG. 3 schematically illustrates operation systems of a standing wheelchair, in accordance with an embodiment of the present invention.

Standing wheelchair 10 includes wheeled base 12 and harness assembly 14. As shown, harness assembly 14 is in an upright mobility configuration. In the upright mobility configuration of harness assembly 14, components of harness assembly 14 are configured to support a user in a standing position.

Wheeled base 12 includes tiltable platform 20 that is supported by chassis 40.

Chassis 40 includes drive wheels 18 and swivel wheels 16. In the configuration shown, drives wheels 18 are located in a front section of wheeled base 12, while swivel wheels 16 are located in a rear section of wheeled base 12. ("Front" and "rear" are determined in relation to a direction that is faced by a user of standing wheelchair 10 when held as intended by harness assembly 14.) For example, drive wheels 18 may be connected via a transmission 84 to a drive motor 82 that is supported by chassis 40. Operation of motor 82 and transmission 84 may be controlled by operation of user controls 36 via a controller 86. For example, the speed of rotation of each of drive wheels 18 may be separately controlled to steer standing wheelchair 10 as wheel as determine a speed of motion of steerable wheelchair 10. Swivel wheels 16 may swivel freely to enable unimpeded steering of standing wheelchair 10.

Other arrangements of wheels are possible. For example, drive wheels may be located in a rear section of the wheeled base, while swivel wheels are located in a front section. As another example, steering wheels 89 may be provided whose direction is controllable by steering mechanism 88, rather than being configured to freely swivel. Thus, in order to assist in steering the standing wheelchair. Additional wheels may be provided. For example, one or more drive wheels may be located in a central section of the wheeled base, while wheels near the front and rear are free to swivel or are steerable.

Wheeled base 12 may house components that enable driving of drive wheels 18, or otherwise enabling self-propulsion of standing wheelchair 10. Wheeled base 12 may house a motor 82 for providing propulsion to drive wheels 18. Motor 82 may represent one or motors (e.g., electrical or otherwise powered). Wheeled base 12 may also house transmission 84 for enabling motion of the motor to rotate drive wheels 18 and power supply 80 for providing power to operate the motor. For example, power supply 80 for an electric motor may include one or more of a battery or storage battery, a cable or connector for connecting a storage battery to an external electric power supply (e.g., electrical mains line), transformers or power converters for converting electric power provided in one form to a form that is usable by another component of standing wheelchair 10, photovoltaic cells or other components to enable at least partial recharging of a storage battery when not connected to an external power supply, and other components. If motor 82 is a fuel-powered motor, power supply 80 may include a container for holding the appropriate fuel, a fuel pump or conduit system, or other systems related to providing fuel to motor 82.

Wheeled base 12 may include, house, or support additional components that enable safe and reliable operation of standing wheelchair 10. For example, wheeled base 12 may include one or more headlamps 38 or other lamps that enable viewing a surface on which standing wheelchair 10 is traveling under conditions of dim or absent ambient lighting. Wheeled base 12 may include one or more sensors that measure parameters of motion or operation of standing wheelchair 10. Such sensors may include one or more of a speedometer, accelerometer, direction sensor (compass or gyroscope), Global Positioning System (GPS) receiver, tilt meter, proximity sensor or rangefinder (e.g., to detect potential obstacles that are overhead or in a direction in which standing wheelchair is traveling), or another sensor that may be utilized to sense one or more conditions that may affect operation of standing wheelchair 10. Some or all of the sensors, or additional sensors, may be located on harness assembly 14.

Tiltable platform 20 may be tilted with respect to chassis 40. A balancing mechanism (BM) 50 may be operated to control the tilt angles (lateral and front-back). Harness assembly 14 is fixed with respect to tiltable platform 20. Thus, tilting tiltable platform 20 by a tilt angle with respect to chassis 40 tilts harness assembly 14 with respect to chassis 40 by the same tilt angle. For example, balancing mechanism 50 may operate one or support elements of adjustable length in order to tilt tiltable platform 20 with respect to chassis 40. Such adjustable elements may include a one or more telescoping, extendible, or slidable elements, or other elements or linear actuators of variable length (e.g., inflatable, or mechanically, chemically, thermally, or electromagnetically activated). The adjustment mechanism may include a screw mechanism, a hydraulic mechanism, a pulley system, a linear actuator operable by a direct current (dc) motor, or another appropriate mechanism.

Thus, for example, balancing mechanism 50 may be operated to keep harness assembly 14 (and a wheelchair user that is strapped into harness assembly 14) upright with respect to the vertical (e.g., as determined by a plumb line) when chassis 40 is supported by a sloped surface.

Figure 6:
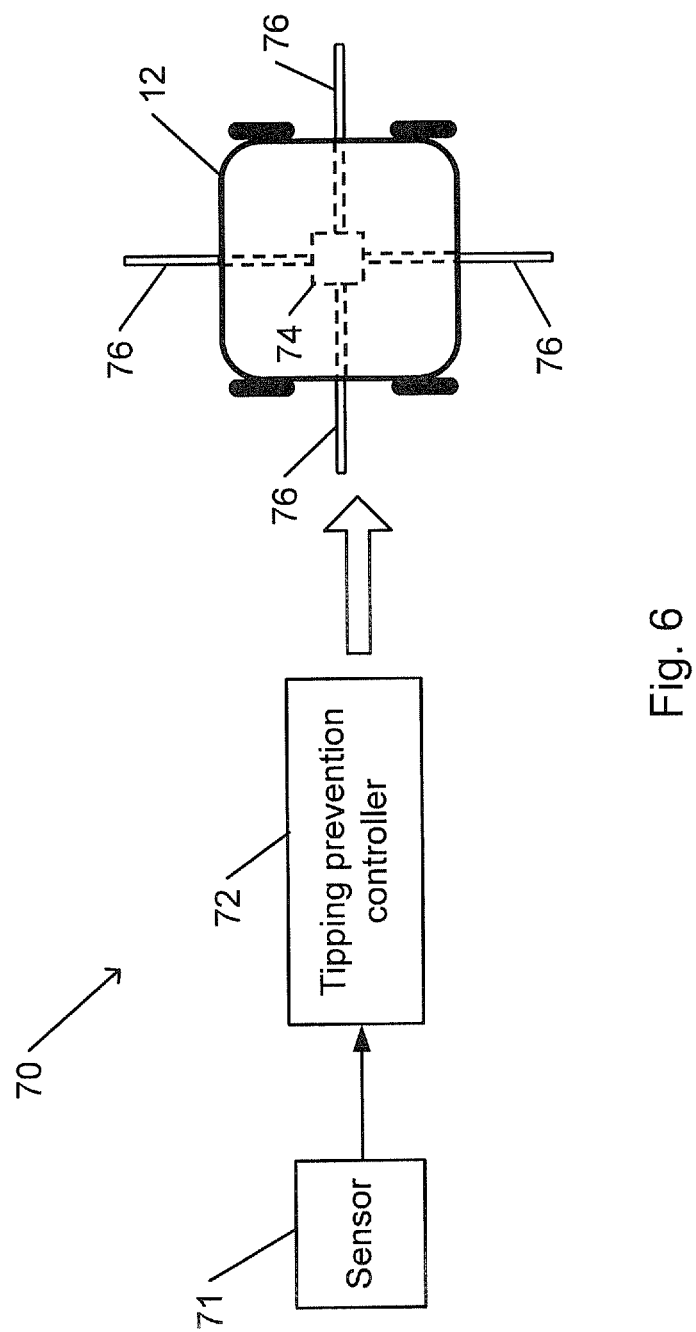
FIG. 6 schematically illustrates operation of a tipping prevention mechanism of a standing wheelchair, in accordance with an embodiment of the present invention.

Wheeled base 12 may include tipping prevention structure operated by a tipping prevention mechanism (TPM) 70 (shown schematically in FIGS. 3 and 6). The tipping prevention structure may include a plurality of support arms 76 that may be extended via openings 30, or otherwise (e.g., from below tiltable platform 20 or from chassis 40) from wheeled base 12. Support arms 76 may include wheels or casters at their distal ends, or may include other structure that enables the arms to support standing wheelchair 10. Support arms 76 may be extendable individually, in groups of two or more, or all together. Typically, at least one support arm 76 is provided to extend from each side of wheeled base 12. Extension of support arms 76 from openings 30 may be controlled by tipping prevention mechanism 70 which is configured to operate automatically. A support arm 76 may be extended, for example, by abrupt release of a cocked spring, by a pyrotechnic mechanism, by an air-pressurized mechanism, or using another mechanism or technique.

Tiltable platform 20 may include an indentation 21 that is configured to accommodate lower sections of harness assembly 14, such as foot supports 32. For example, indentation 21 may be U-shaped.

Harness assembly 14 is configured to securely hold a user of standing wheelchair 10 in place, whether the user is standing, sitting, reclining, in a position that is intermediate between other positions, or in a another position for which harness assembly 14 is configured. Harness assembly 14 is configured to move parts of the user's body to change a position of the body, e.g., from standing to sitting or vice versa.

Harness assembly 14 includes a set of braces 24 for attaching to various parts of the user's body, in particular to the lower parts of the body. For example, various braces 24 may attach to the lower torso, back or pelvis of the user, to each thigh of the user, to a calf, shin, or lower leg of the user, or other parts of the user's body. Harness assembly 14 includes foot supports 32 for placement under and support of, and for holding, the user's feet. Some or all of braces 24 may be provided with straps 28 or similar supportive arrangement (e.g., torso belt) that may be fastened and adjusted to secure a part of the user's body to a brace 24.

Harness assembly 14 may be in the form of or include an exoskeleton (ES) that holds the user's body primarily from the side. The ES may support the user in all the various configurations (standing, sitting, reclining, or in other configuration). For example, in a sitting configuration, a flexible component 25 (visible in FIG. 2) of brace 24 (e.g., made of flexible cloth, plastic, rubber, netting, mesh, or another flexible material, structure, or construction) may support the user's buttocks.

Some or all of pairs of adjacent braces 24 are connected by bendable joints. For example, bendable joints may include some or all of a hip joint 26, a knee joint 27, and an ankle joint 29. The bendable joints may be bent or straightened during a transition from one position of the user to another (e.g., from standing to sitting to reclining, or vice versa). Some of the bendable joints may be active in that a force is directly applied by an actuator to each of those joints to bend or straighten that joint. Others of the bendable joints may be passive in that each of those joints is bent or straightened in response to motion of the adjacent braces by forces that are applied the active joints.

In accordance with some embodiments of the present invention, hip joint 26 is an active joint, while knee joint 27 and ankle joint 29 are passive. Other arrangements or combinations of active and passive joints are possible.

For example, each active joint may be provided with a small local actuator motor (e.g., operating on direct current). As another example, a suitable transmission mechanism may be provided to transmit force to flex or extend a joint from a remote motor (e.g., located in wheeled base 12 or elsewhere). Such a transmission mechanism may include, for example, rods, gears, cables, Bowden cables, pulleys, or other suitable transmission mechanisms. A passive joint may include a hinge, axis, ball-in-socket, or other mechanism that enables passive flexing or extending of the joint.

Lifting unit 33 is mounted on wheeled base 12. Lifting unit 33 supports hip joint 26 of harness assembly 14, and is configured to raise or lower hip joint 26. For example, lifting unit 33 may include one or more extendible columns 34. Other mechanisms for lifting unit 33 are possible (e.g., a pulley arrangement for lifting or lowering hip joints 26 from a structure that extends above hip joints 26, or another mechanism).

Harness assembly 14 is connected to wheeled base 12 by extendible columns 34. For example, an upper end of extendible column 34 may connect to hip joint 26 of harness assembly 14. Extendible column 34 may be reinforced to withstand bending forces by reinforcement struts 35.

The length of each extendible column 34 is adjustable. For example, each extendible column 34 may include two or more telescoping components, such as column sleeve 34a within which inner column 34b may be made to slide. A suitable extension/retraction mechanism may be operated to adjust the length of extendible column 34. Other mechanisms for adjusting the length of extendible column 34 may be employed.

For example, extendible column 34 may include a linear electric actuator that includes a dc motor operating a ball-screw gear mechanism, or a hydraulic (or pneumatic) piston that changes the length of extendible column 34. A suitable pump, e.g., located in wheeled base 12, may be operated to adjust the length of extendible column 34. As another example, a motorized mechanical system (e.g., including a motor and a suitable transmission, e.g., including gears, rods, Bowden cables, pulleys, or other components) may be operated to extend or retract extendible column 34.

A configuration of harness assembly 14 may be changed by lengthening or shortening of extendible columns 34. For example, extension of extendible column 34 may change the configuration of standing wheelchair 10 to the upright mobility configuration shown in FIGS. 1A and 1B. In the upright mobility configuration of standing wheelchair 10, a user that is strapped into harness assembly 14 is made to stand substantially above an epicenter (in the horizontal plane) of wheeled base 12 (e.g., a center of gravity of the user is substantially above the epicenter). The epicenter (in the horizontal plane) of wheeled base 12 may substantially coincide with the COG of wheeled base 12. All braces 24 are arranged approximately vertically one above the other. Similarly, foot supports 32 are placed approximately below where the user's body is expected to be placed.

Figure 2:
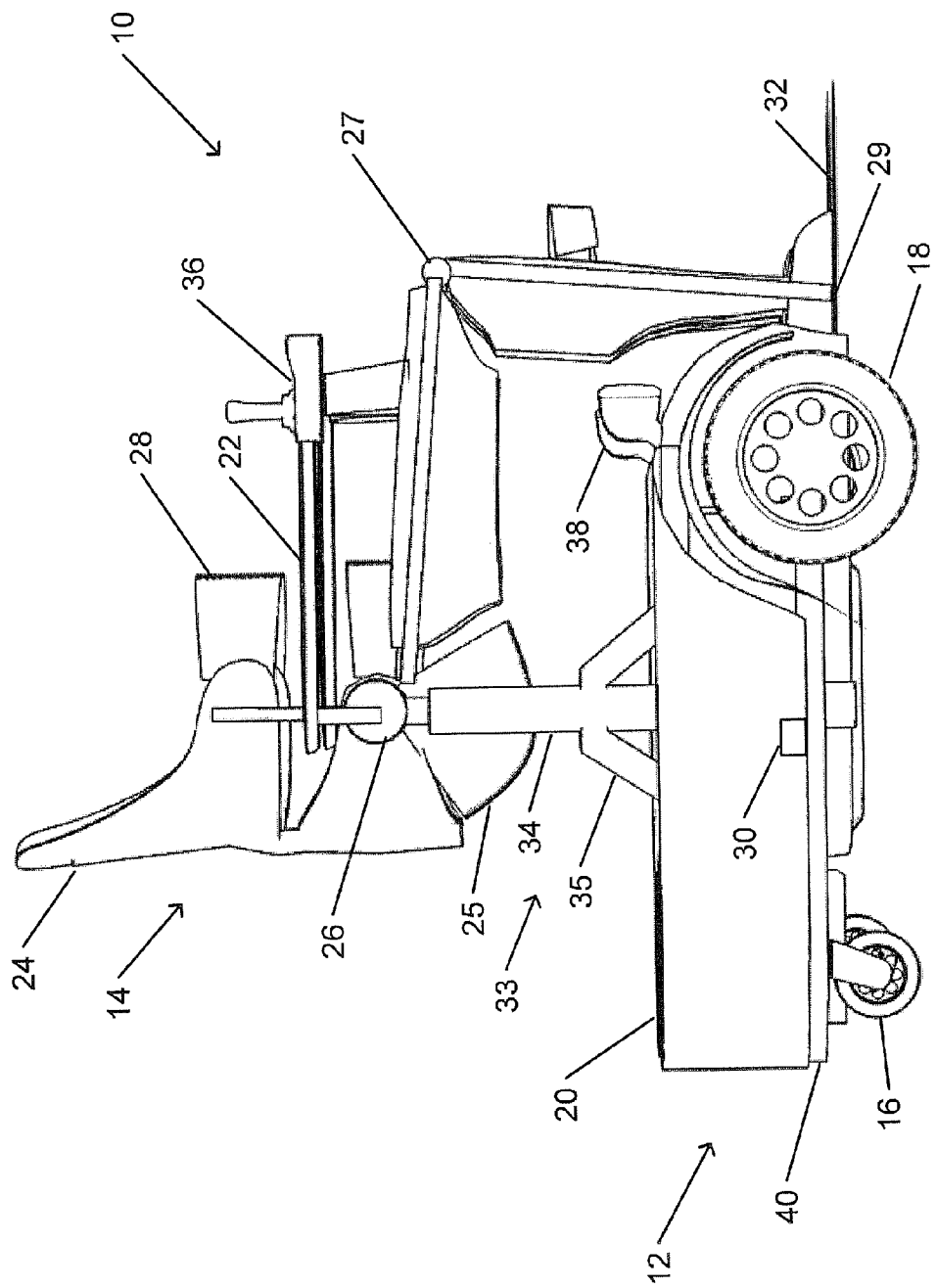
FIG. 2 shows a side view of the standing wheelchair shown in FIG. 1A, in a sitting configuration, in accordance with an embodiment of the present invention.

When standing wheelchair 10 is initially in an upright mobility configuration (as shown in FIGS. 1A and 1B), extendible columns 34 may be shortened to change the configuration of standing wheelchair 10 to a sitting configuration. FIG. 2 shows a side view of the standing wheelchair shown in FIG. 1A, in a sitting configuration, in accordance with an embodiment of the present invention.

In the sitting configuration of standing wheelchair 10 shown in FIGS. 2 and 3, extendible columns 34 have been shortened such that hip joint 26 is approximately at the same height as, knee joint 27. Foot supports 32 have been slid forward (out of indentation 21).

Harness assembly 14 may include armrests 22. Armrests 22 may be configured to be raised or lowered as needed. For example, armrests 22 may be folded downward or pushed to the sides when standing wheelchair 10 is in a sitting configuration in order to enable the user's torso to approach a table top (with the user's legs positioned under the table).

A user of standing wheelchair 10 may operate user controls 36 to operate various functions of standing wheelchair 10. For example, the user may operate user controls 36 to control self-propelled motion of standing wheelchair 10 over a surface. Control of motion of standing wheelchair 10 may include control of a motor (e.g., power or speed of operation of the motor), operation of a transmission (e.g., selection of gear ratio, forward/reverse motion, right/left wheel rotation for steering), operation a steering mechanism (e.g., that determines the direction of a steering wheel), operation of a brake, selection of a power source (e.g., main or auxiliary battery or power source), or other operation related to motion of standing wheelchair 10. A user may operate user controls 36 to change a configuration of standing wheelchair 10.

User controls 36 comprise one or more user-operable devices. For example, user controls 36 may include a manually operated device such as a joystick, a pushbutton, a switch, a knob or dial, a touch screen, or other manually operable device. User controls 36 may include force- or orientation-sensitive sensors, such as pressure sensitive regions or sensors, tilt sensors. User controls 36 may include a sound-sensitive sensor, such as a microphone or audio transducer, for sensing an audible signal or voice command.

User controls 36 may include one or more output devices, such as display panels or screens, warning lights, sound generation devices (speaker, buzzer, bell, or other sound generation device), to inform a user of standing wheelchair 10 of a current status of standing wheelchair 10. For example, a status may include a state of charging of a battery, a current speed, a current heading, presence of an obstacle, warning of a potential unsafe situation (e.g., excessive tilt or acceleration), or a status of one or more subsystems or assemblies of standing wheelchair 10.

For example, a joystick of user controls 36 may be operated to control motion of standing wheelchair 10 over a surface.

As another example, motion of standing wheelchair 10 may be controlled in response to a sensed tilt (e.g., voluntary or involuntary) of the user's body. One or more tilt sensors may be placed on the user's body (e.g., on the user's arms, shoulders, chest, or upper back). A slight voluntary forward leaning of the upper body may signify a desire to travel forward, while right and left leaning may indicate a desire to right or left, respectively. Similarly, backward leaning or bending may signify a desire to stop, while continue backward leaning may signal a desire to travel backward. A sudden (e.g., involuntary) jerking of the user's body may cause emergency braking, e.g., as indicating a frightening or unexpected situation.

As still another example, pressure sensors or strain gauges may be located within harness assembly 14 (e.g., incorporated into straps 28). A detected applied stress on the sensors may be interpreted as indicating a desired motion of standing wheelchair 10. A direction (and, possibly, magnitude) of the detected stress may indicate the direction (and, possibly, speed) of the desired motion.

As yet another example, spoken or vocal commands may be interpreted by a processor that is incorporated into standing wheelchair 10 to indicate a desired motion (or other operation) of standing wheelchair 10.

One or more controls of user controls 36 (e.g., a switch or pushbutton) may be operated to change a configuration of standing wheelchair 10.

For example, a change of standing wheelchair 10 from an upright mobility (standing) configuration to a sitting configuration may include shortening extendible columns 34, (active) bending of hip joint 26 (and rotation of a brace 24 that is attached to the user's thighs, and possibly of another brace 24 that is attached to the hips or buttocks of the user), (passive) bending of knee joint 27, resulting in forward motion of foot supports 32. A further change from a sitting configuration to a reclining configuration may include straightening of hip joint 26 (and active straightening of knee joint 27) without any change in the length of extendible column 34, until the desired reclining position is achieved.

A change of standing wheelchair 10 from a sitting configuration to an upright mobility (standing) configuration may include, for example, lengthening extendible columns 34, (active) straightening of hip joint 26, (passive) straightening of knee joint 27, resulting in backward motion of foot supports 32 to below the user's body.

In accordance with some embodiments of the present invention, standing wheelchair 10 may include a balancing mechanism (BM) 50 (shown schematically in FIGS. 3 and 5) to keep a user of standing wheelchair 10 upright, or at another desired leaning position, when standing wheelchair 10 is traveling over a sloped surface. The balancing mechanism is configured to tilt tiltable platform 20 relative to chassis 40 so as to maintain tiltable platform 20 in a horizontal, or another desired (e.g., in which the user is leaning in a desired direction), orientation. For example, separate balancing mechanisms may be provided to control the tilt of tiltable platform 20 in the lateral (right-left) and front-back (forward-backward) directions. Alternatively, a single balancing mechanism may control tilt in arbitrary directions.

FIG. 4A schematically illustrates operation of a lateral balancing mechanism of a standing wheelchair, in accordance with an embodiment of the present invention.

Chassis 40 is shown as tilted with respect to the horizontal in a lateral direction. For example, such a tilt may result when standing wheelchair 10 is traveling on a laterally sloping surface (e.g., crossing a sloped driveway or traveling on a banked or crowned roadway). Tiltable platform 20, and thus harness assembly 14, have been tilted by lateral tilt angle 42 such that tiltable platform 20 remains horizontal (or tilted with another desired tilt angle).

FIG. 4B schematically illustrates operation of a front-back balancing mechanism of a standing wheelchair, in accordance with an embodiment of the present invention.

Chassis 40 is shown in FIG. 4B as tilted with respect to the horizontal in a front-back direction. For example, such a tilt may result when standing wheelchair 10 is traveling on a forward- or backward-sloping surface (e.g., on sloped driveway or wheelchair access ramp). Tiltable platform 20 and, thus, harness assembly 14 have been tilted by front-back tilt angle 44 such that tiltable platform 20 remains horizontal (or at another desired tilt angle).

The balancing mechanism that controls tilting of tiltable platform 20 may be controlled by one or more controllers.

Figure 5:
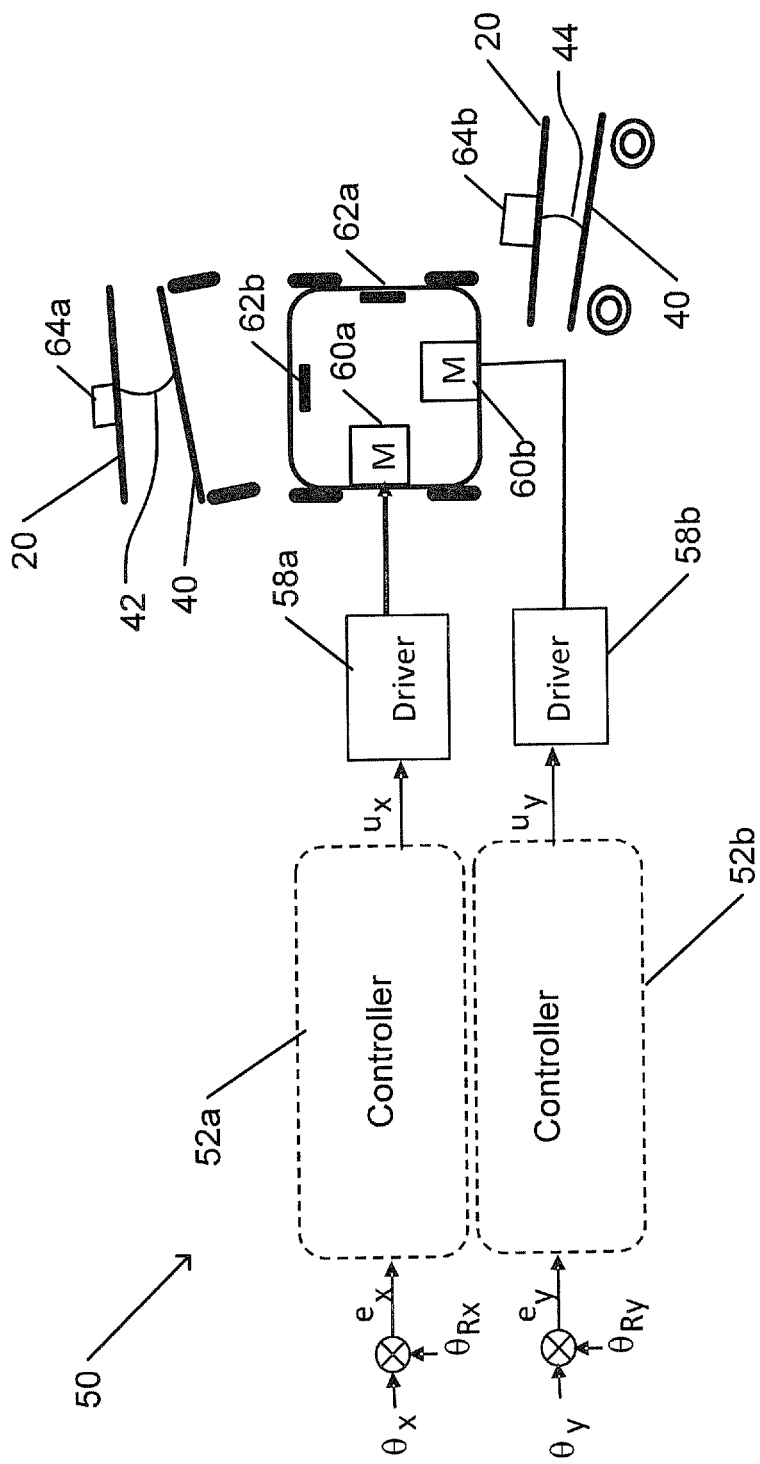
FIG. 5 schematically illustrates control of a balancing mechanism of a standing wheelchair, in accordance with an embodiment of the present invention.

FIG. 5 schematically illustrates control of a balancing mechanism of a standing wheelchair, in accordance with an embodiment of the present invention.

For example, balancing mechanism 50 may be configured to maintain tiltable platform 20 in a particular desired orientation defined by lateral reference angle $\theta_{Rx}$ and front-back reference angle $\theta_{Ry}$. Alternatively or in addition, another set of angles may be defined, such as a magnitude and orientation (e.g., azimuth) of the desired tilt. The reference angles may be permanently defined (e.g., $\theta_{Rx}=\theta_{Ry}=0$ for a horizontal tiltable platform 20, or with another value). Alternatively or in addition, the reference angles may be defined by a user, or in accordance with predefined criteria, for a particular user or situation.

Tiltable platform 20 (or a component that is attached to tiltable platform 20, such as harness assembly 14) may be provided with one or more tilt sensors. For example, the tilt sensors may include lateral tilt sensor 64a to measure lateral tilt angle $\theta_x$, and front-back tilt sensor 64b to measure front-back tilt angle $\theta_y$. Alternatively or in addition, one or more sensors may measure another set of values, such as a magnitude of a tilt, and a direction (e.g., azimuth) of the tilt. Tilt sensors may include an accelerometer, a gyroscope, or another type of tilt sensor. The sensor may be incorporated into an integrated circuit or other electronic device.

Balancing mechanism 50 controls one or more components that adjust a tilt of tiltable platform 20 relative to chassis 40. For example, the components may include one or more active components or actuators, represented by lateral tilt actuator 60a and front-back tilt actuator 60b. Lateral tilt actuator 60a and front-back tilt actuator 60b may include linear motors or actuators (e.g., a strut of variable length), that determine a distance between corresponding points on tiltable platform 20 and on chassis 40. Alternatively or in addition, other combinations of motors or actuators may be used (e.g., a tilt-azimuth actuator). The components may include one or more passively operated components, represented by lateral restoring spring 62a and front-back restoring spring 62b. For example, a single actuator, such as lateral tilt actuator 60a, may operate near one edge of tiltable platform 20 and of chassis 40, while a passively operated component, such as lateral restoring spring 62a, may be placed near the opposite edge.

Operation of lateral tilt actuator 60a is controlled via lateral driver 58a in response to a time (t) dependent lateral control signal $u_x(t)$ produced by lateral controller 52a. Operation of front-back tilt actuator 60b is controlled by front-back driver 58b in response to a front-back control signal $u_y(t)$ produced by front-back controller 52b.

Lateral controller 52a and front-back controller 52b may include a single controller or two or more separate controllers. Each controller may include a processor or circuitry that is configured to control tilt of tiltable platform 20 to achieve a particular reference angle. For example, lateral controller 52a or front-back controller 52b may be configured as a proportional-integral-differential (PID) controller, or as another closed-loop or other controller.

Lateral controller 52a and front-back controller 52b may be configured to operate on the basis of an input reference angles, $\theta_{Rx}$ and $\theta_{Ry}$, respectively, and a real-time measured tilt angle, $\theta_x$ and $\theta_y$, of tiltable platform 20. A difference or error value as of a function of time t, $e_x(t)$ or $e_y(t)$, may be calculated (e.g., $e_x(t)=\theta_x-\theta_{Rx}$). PID controller theory, or another control algorithm, may be applied to yield control signals $u_x(t)$ and $u_y(t)$, that may be applied to the appropriate lateral driver 58a and front-back driver 58b to control the corresponding lateral tilt actuator 60a and front-back tilt actuator 60b. For example, control signal $u_x(t)$ and $u_y(t)$ may be configured to optimally achieve the tilt of tiltable platform 20 as specified by reference angles $\theta_{Rx}$ and $\theta_{Ry}$, or maximally rapid minimization of the error functions $e_x(t)$ and $e_y(t)$ (e.g., $|e_x(t)|, |e_y(t)|)\rightarrow\min$, where the vertical bars designate absolute value).

In accordance with some embodiments of the present invention, a standing wheelchair is provided with a tipping prevention mechanism.

FIG. 6 schematically illustrates operation of a tipping prevention mechanism of a standing wheelchair, in accordance with an embodiment of the present invention.

Tipping prevention mechanism 70 controls extension of stabilization arms 76 from wheeled base 12.

Sensor 71 is configured to measure a quantity that is indicative of stability or of tipping of wheeled base 12 of a standing wheelchair. For example, sensor 71 may include one or more tilt sensors (e.g., including a level, gyroscope, or accelerometer) that measure a quantity that is interpretable to indicate a state of stability or instability of wheeled base 12 or of the standing wheelchair. For example, a tilt angle or rate of change of tilt of the standing wheelchair may be measured, or an acceleration of one or more components of the standing wheelchair may be measured. Sensor 71 may include a proximity sensor (e.g., optical, acoustical, electromagnetic, or mechanical) that may detect a change in distance between wheeled base 12 and a surface upon which the standing wheelchair is being supported. Sensor 71 may include a stress or force sensor that measures a force exerted by a harness assembly on a user of the standing wheelchair. Sensor 71 may include a stress or force sensor that measures a force between a wheel of wheeled base 12 and a surface upon which the wheel is placed. Sensor 71 may measure a measured quantity as a function of time, or may measure a rate of change of the measured quantity.

Tipping prevention controller 72 is configured to receive a signal from sensor 71 and to control operation of arm extension mechanism 74. For example, tipping prevention controller 72 may include a processor that is configured to operate in accordance with programmed instructions that are stored on an associated memory or data storage unit. As another example, tipping prevention controller 72 may include dedicated circuitry (e.g., including an appropriately configured integrated circuit) that is configured to operate arm extension mechanism 74 in accordance with a signal that is received from sensor 71.

Tipping prevention controller 72 is configured to interpret signals that are received from sensor 71 and to detect an indication of tipping, or of danger of tipping, of the standing wheelchair.

For example, a detected tilt angle may be compared with a threshold angle. A detected tilt angle that exceeds the threshold angle may be indicative of tipping. Similarly, a rapid change in tilt angle may be indicative of tipping. Tilt angles (or their rates of change or their absolute values) in each direction (e.g., right, left, front, or back) may be compared separately with angle thresholds for a particular direction (e.g., which may be different from one another due to asymmetry in the shape or structure of the standing wheelchair). Alternatively or in addition, a magnitude of the tilt angle or of a change of the magnitude (e.g., irrespective of direction) may be compared with a threshold value. Upon detection of such indicated excessive tilt, tipping prevention controller 72 may operate arm extension mechanism 76 to extend one or more stabilization arms 76.

Other sensed conditions may be indicative of tilting. For example, a sudden change of distance between wheeled base 12 and a surface below wheeled base 12 may be indicative of approach or crossing of an edge such as a curb, stair, depression (e.g., hole, sewer, gutter, ditch, channel, ledge), or other change in topography that could precipitate tipping. Similarly, a detected increase in force on the user or harness assembly may indicate excessive lateral force (e.g., centrifugal force) that could precipitate tipping. A sudden reduction of ground force on a wheel of wheeled base 12 may be indicative of tipping or of crossing an edge that could precipitate tipping. Any such indication, when exceeding a threshold value for that indication, may be interpreted as requiring operation of arm extension mechanism 74 to extend one or more stabilization arms 76.

Arm extension mechanism 74 may be operated to extend one or more stabilization arms 76. For example, stabilization arms 76 may be extended only on a side toward which tilting is indicated (or on two sides when diagonal tipping is indicated). Stabilization arms 76 may be extended diagonally downward or downward. Alternatively or in addition, all stabilization arms 76 may be extended when tipping is indicated (e.g., to enable simplification of arm extension mechanism 74), or in circumstances in which potential tipping in any direction is indicated. Distal ends of stabilization arms 76 may include casters or wheels. The casters or wheels may enable at least limited mobility or travel of the standing wheelchair after extension of stabilization arms 76.

Arm extension mechanism 74 may be configured to rapidly deploy stabilization arms 76.

For example, arm extension mechanism 74 may include a pre-compressed or cocked spring that is configured to extend a stabilization arm 76. A stop prevents the restoration force of the spring from extending the stabilization arm 76 when not needed. Operation of arm extension mechanism 74 then releases the stop, enabling the restoration force of the spring to rapidly extend and deploy that stabilization arm 76. An appropriate catch or stop mechanism may hole the stabilization arm 76 in its extended state. As another example, arm extension mechanism 74 may include a supply of pressurized gas (e.g., in a canister behind each stabilization arm 76) that may be released to rapidly extend and deploy a stabilization arm 76. Other mechanisms (e.g., magnetic, electromagnetic, hydraulic, pyrotechnic, mechanical, or other mechanisms) may be provided to rapidly deploy a stabilization arm 76.

Depending on the deployment mechanism, once the situation of indicated tipping has ended, stabilization arms 76 may be restored to their pre-deployment state. For example, a mechanism or control may be provided to enable a user of the standing wheelchair to retract stabilization arms 76. Alternatively or in addition, assistance in retracting stabilization arms 76 may be required from a person who is not strapped into the harness assembly of the standing wheelchair. For example, stabilization arms 76 may be manually pushed into wheeled base 12 to their pre-deployed positions. In some cases (e.g., with a mechanical spring or electromagnetic deployment mechanism), pushing stabilization arms 76 back into wheeled base 12 may prepare stabilization arms 76 for possible future deployment. In other cases (e.g., with a compressed gas or pyrotechnic deployment mechanism), additional actions (e.g., compressing gas, replacing a gas canister, or replacing an explosive charge) may be required to prepare stabilization arms 76 for further deployment.

Prior to, concurrent with, or following deployment of stabilization arms 76, one or more alarm signals may be generated, e.g. by tipping prevention controller 72 using an appropriate output device. For example, a signal that is detectable by the user may warn the user of an indication of imminent tipping, or may apprise the user of deployment of stabilization arms 76. A signal that may be detected by an outside party (e.g., an acquaintance of the user, a service provider, or passerby) may indicate a need to come to the assistance of the user. Further alarm signals may indicate lack of availability of tipping prevention mechanism 70 (e.g., after a previous deployment, or after a self-check indicates a need for servicing). When tipping prevention mechanism 70 is unavailable, operation of a drive mechanism of the standing wheelchair may be limited. For example, a maximum available speed of self-propulsion of the standing wheelchair may be reduced while tipping prevention mechanism 70 is not fully operational.

The invention claimed is:

1. A standing wheelchair device comprising:
    a wheeled base for enabling the device to move on a supporting surface, the wheeled base including a platform that is tiltable with respect to a chassis to which wheels of the wheeled base are connected, a harness assembly being tiltable together with the platform;
    a proportional-integral-differential (PID) controller that is configured to maintain the platform at a predetermined tilt with respect to the horizontal;
    the harness assembly comprising a plurality of braces for attaching to parts of a body of a user of the device, at least some adjacent braces of said plurality of braces being connected by joints; and
    a lifting unit mounted on the base, supporting a hip joint of the harness assembly, and configured to raise or lower the hip joint such that when the user is attached to the harness assembly and is in a sitting position, raising a height of the hip joint causes the user to assume a standing position, and when the user is attached to the harness assembly and is in the standing position, lowering the hip joint causes the user to assume the sitting position or a reclining position.

2. The device of claim 1, wherein the wheeled base comprises drive wheels that are operable by the user to cause the device to move over the supporting surface.

3. The device of claim 1, wherein the wheeled base comprises swivel wheels or steering wheels.

4. The device of claim 1, wherein the hip joint is an active joint.

5. The device of claim 1, wherein a knee joint of the harness assembly is an active joint.

6. The device of claim 1, comprising a sensor to detect a tilt of the platform.

7. The device of claim 1, comprising a motor that is operable to adjust a tilt of the platform.

8. The device of claim 1, comprising a user-operable control for controlling operation of the device.

9. The device of claim 8, wherein the control comprises a user-operable device selected from a group of user-operable devices consisting of a joystick, a tilt sensor, a force sensor, and a microphone.

10. The device of claim 1, wherein the lifting unit comprises at least one column of adjustable height.

11. The device of claim 10, wherein said at least one column is positioned such that when the user is attached to the harness assembly and is in the standing position, the user is positioned substantially above an epicenter of the wheeled base.

12. The device of claim 10, wherein said at least one column comprises a mechanism for adjusting a height of the at least one column, the mechanism being selected from a group of mechanisms consisting of a direct current motor, a ball screw gear, a hydraulic piston, a pneumatic piston, a Bowden cable, and a pulley.

13. The device of claim 1, comprising at least one support arm that is extendable to prevent tipping of the device.

14. The device of claim 13, wherein a support arm of said at least one support arm is extendible from each side of the device.

15. The device of claim 13, comprising a controller that is configured to automatically extend said at least one support arm when tipping of the device is indicated.

16. The device of claim 13, comprising a sensor to generate a signal that is indicative of tipping of the device.

17. The device of claim 16, wherein the sensor is selected from a group of sensors consisting of a tilt sensor, an accelerometer, a gyroscope, a force sensor, and a proximity sensor.

* * * * *